(12) United States Patent
Werkema, Jr.

(10) Patent No.: US 7,388,381 B1
(45) Date of Patent: Jun. 17, 2008

(54) HIGH RESOLUTION GEOELECTRICAL PROBE

(75) Inventor: Douglas D. Werkema, Jr., Las Vegas, NV (US)

(73) Assignee: U.S. Environmental Protection Agency, Washington, DC (US)

( * ) Notice: Subject to any disclaimer, the term of this patent is extended or adjusted under 35 U.S.C. 154(b) by 0 days.

(21) Appl. No.: 11/738,659

(22) Filed: Apr. 23, 2007

(51) Int. Cl.
*G01V 3/02* (2006.01)
*G01V 3/00* (2006.01)
(52) U.S. Cl. .................. 324/347; 73/866.5; 702/11
(58) Field of Classification Search ........ 324/347–348, 324/351–355, 323; 436/28–29, 149; 702/2, 702/11–13; 73/152.02, 152.05, 886.5
See application file for complete search history.

(56) References Cited

U.S. PATENT DOCUMENTS

| | | | | |
|---|---|---|---|---|
| 5,482,402 A | * | 1/1996 | Nelson | 405/128.65 |
| 5,804,715 A | * | 9/1998 | Bennett | 73/170.32 |
| 5,902,939 A | * | 5/1999 | Ballard et al. | 73/863.12 |
| 7,301,345 B2 | * | 11/2007 | Chen et al. | 324/347 |

* cited by examiner

*Primary Examiner*—Bot LeDynh
(74) *Attorney, Agent, or Firm*—Browdy & Neimark, PLLC; Anne Kornbau

(57) ABSTRACT

A in situ probe for the measurement of the geoelectrical properties of a geological formation. The probe serves as the interface between a standard acquisition system and the earth. The probe is customizable in its length and the type of electrodes used to make contact with the geologic formation. The probe is permanently installed for long term measurements, it contains closely spaced electrodes enabling a high vertical or depth resolution of measurements. The electrode type is customizable either stainless steel or non-polarizing.

5 Claims, 7 Drawing Sheets

Drive point

HIGH RESOLUTION GEOELECTRICAL PROBE

FIELD OF THE INVENTION

The probe disclosed and claimed herein is configured for long-term high resolution measurement of the geoelectrical properties, i.e. resistivity, self-potential, and induced polarization, of the earth's near subsurface.

BACKGROUND OF THE INVENTION

The electrical properties of the earth can be measured using metallic or non-polarizing electrodes, which make direct galvanic contact with the earth, or by inducing an electromagnetic field into the earth. The invention proposed utilizes electrodes to make direct galvanic contact (DC resistivity method) with the earth and does not enable electromagnetic induction measurements. The invention proposed does not make the geoelectrical measurement, rather it serves as the tool which couples the earth to an industry standard acquisition instrument.

The propagation of electrical current into the earth is governed by the earth material (i.e. consolidated or unconsolidated rock) and the electrolyte, which is the fluid occupying the pore space, within the earth material. The rock or sediment type has characteristic electrical resistivities (resistance to electrical current propagation). Furthermore, if the volume of earth that is measured contains a conductive electrolyte within the pore space of the measured volume, the geoelectric response will be less electrically resistive.

This invention utilizes electrodes which are in contact with the earth. The DC resistivity method uses electrodes that are configured in certain geometric configurations to measure the resistivity of a volume of the earth. Therefore the geoelectrical measurement is indicative of the geoelectrical properties of the volume of earth measured. Such a measurement is termed the apparent resistivity as it is the effective resistivity of the volume of earth determined by this geometrical arrangement of the electrodes.

The DC resistivity method has been used since the early part of the 20$^{th}$ century. DC resistivity can be used with surface electrodes, electrodes down an open borehole, or with permanently emplaced downhole electrodes. This invention is a specific type of the latter.

SUMMARY OF THE INVENTION

A down-hole, in situ geoelectric probe is provided comprising stainless steel ring electrodes, which provide contact with the earth, and small gauge wires to connect to a separate industry standard acquisition instrument. The probe operates based on electric conduction via the wires and the electrodes, which are in contact with the earth, to measure the geoelectrical properties of the earth. The probe is proposed as the invention, not an acquisition instrument.

The probe is capable of in situ, long-term measurement and monitoring of the electrical resistivity, self potential, and induced polarization of the near subsurface of the earth. The probe is essentially a dry well made of non-electrically conductive (e.g. PVC, HDPE, etc.) pipe with electrically conductive ring electrodes positioned along the outside of the probe pipe. The electrodes are separated by 5 or 10 cm, for example, or the spacing is customized per the specific application. Each electrode has its own environmentally sealed and protected wire with continuity to the surface. Each wire is sealed inside the probe pipe, while the electrode is on the outside of the probe pipe.

The probe can be of any length suitable for the particular purpose for which it is used. The probe can be made of a plurality of sections, which are connected together during installation, or installed as a single section depending on the needs of the application. The installation depth, and hence the number of probe sections used, is analogous to a monitoring well installation depth. The connections between probe sections are environmentally sealed so no subsurface fluid or sediment/solid material can enter the interior of the probe.

The probe is installed into the subsurface either by direct push, into a pre-drilled hole, or via a hollow stem auger type monitoring well installation. Installation is accomplished with very little angular space, so that the probe's electrodes are tight with the earth's subsurface.

While the electrodes can be made of any conducting material, they are preferably made of a high grade stainless steel ring recessed into the wall of the probe so that they are flush with the outer surface of the probe and resistant to degradation. Additionally, the electrodes can be customized to include non-polarizing electrodes for self-potential or induced polarization measurements.

The probe can be of any diameter suitable for the particular use. Ultimately the diameter is governed by the length of the probe, the number of electrodes, and the number of corresponding wires inside the probe.

The first section of the probe inserted into the earth contains a drive point to aid the installation and seal the end of the probe.

Each electrode is connected to its own individual wire which is lead to the surface inside the probe pipe for connection to an industry standard acquisition instrument. The gauge of the individual wires can vary. Typically, wire gauges ranging from 26 to 22 are recommended.

At probe section joints, the electrode spacing is consistently distributed across these joints. For instance, for a probe with a 10 cm electrode spacing, the electrode spacing from the first electrode of the new probe section to the last electrode of the old probe section must maintain the 10 cm separation. Therefore, these electrodes are 5 cm from the respective probe ends.

As an example, a 3 meter probe with electrodes arranged every 10 cm has 30 electrodes and, therefore, 30 wires. This is a single 3 meter section of probe. These wires are labeled or demarcated such that the deepest wire is connected to the deepest electrode and numbered or identified accordingly. Each subsequent electrode-wire pair is identified or numbered so each electrode can be addressed via its own wire. These wires are then connected to a geoelectrical acquisition instrument (standard industry instrument) for data collection.

If a probe to 3 meters is required for a particular application, then one probe section would suffice. If a deeper application is required, then multiple sections would be connected.

For example, to install a 9 meter long probe, 3 separate 3 meter probe sections with 30 electrodes every 10 cm would be connected such that a total of 90 electrodes would be used. As a result, 90 wires would exit the top of the probe at the earth's surface and then connect to an acquisition instrument.

The challenge in connecting multiple probe sections is connecting the wires such that electrical continuity is maintained and the wires do not twist and break. This is accomplished by either a swivel or ball bearing section joint, multi-connector keyed plug with outer slide sleeve closure, or an inner wire conduit allowing the wires to rotate. Each of these options is customizable per the probe application.

DETAILED DESCRIPTION OF THE INVENTION

Figure 1:
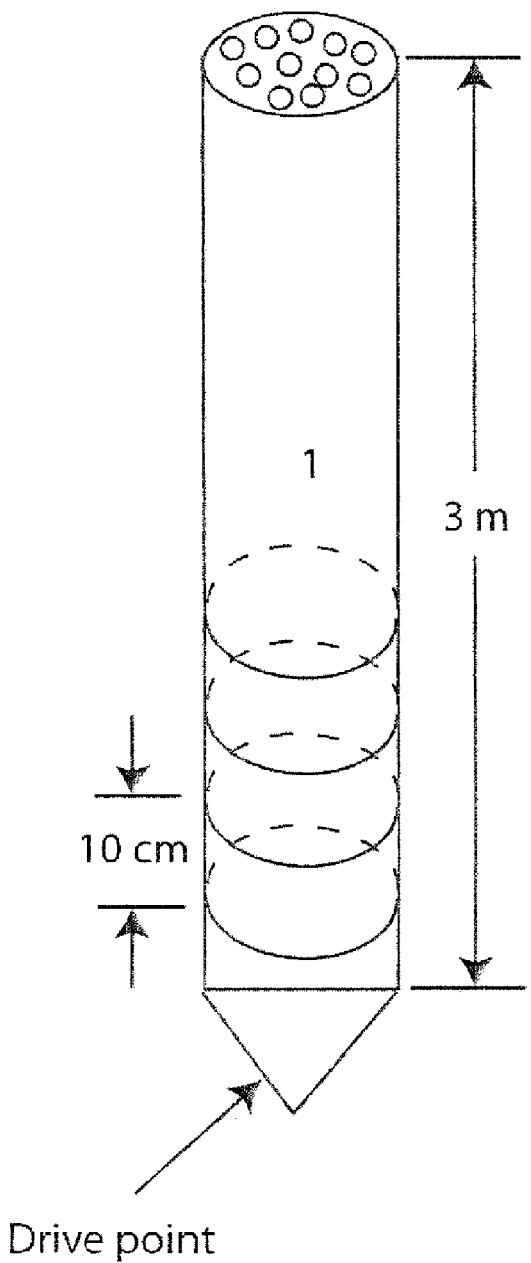
FIG. 1 is an orthogonal view of a 3 meter section of the geoelectrical probe containing electrodes numbered 1 to 30. This is the first section inserted into the ground and includes a drive point.

The geoelectrical probe is configured for in situ long-term measurement of an electrical profile of the earth's near subsurface. As shown in FIG. 1, the first section of a geoelectrical probe includes a drive point. This section could serve as the total probe length of 3 meters, or additional probe lengths could be attached to increase the length of the probe. For this 3 meter section, illustrated in FIG. 1, there is one wire connected to each stainless steel ring electrode. For the 3 meter length of the probe, the electrodes are separated every 10 cm, thereby resulting in 30 electrodes, 30 wires, and 30 wire socket connections at the top of the probe. If the final probe is just 3 meters long, then an extension wire with a 30 pin connection is connected to the probe via the sockets and then to an acquisition instrument or electrode addressing system. If, however, more probes are to be utilized for a longer and hence deeper total probe, then the next probe section is connected to this 30 socket connection. This connection can be made with a swivel or ball bearing connection, with a keyed slip ring, or via an inner wire conduit so that additional sections can be connected without twisting and breaking the wire.

Figure 6:
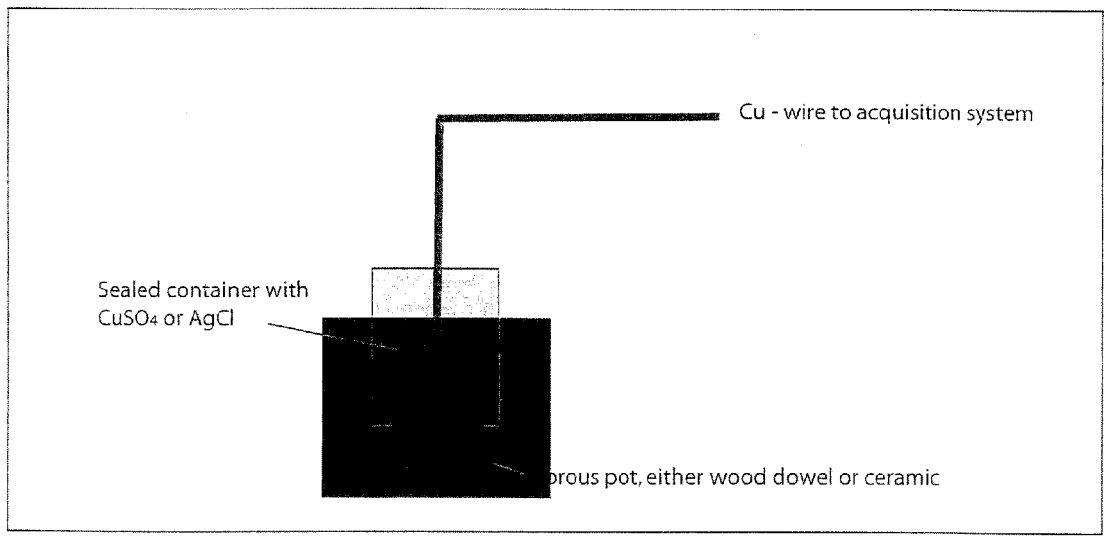
FIG. 6 is a schematic of a non-polarizing electrode which would replace the stainless steel ring electrodes for self potential or induced polarization measurements.
Figure 7:
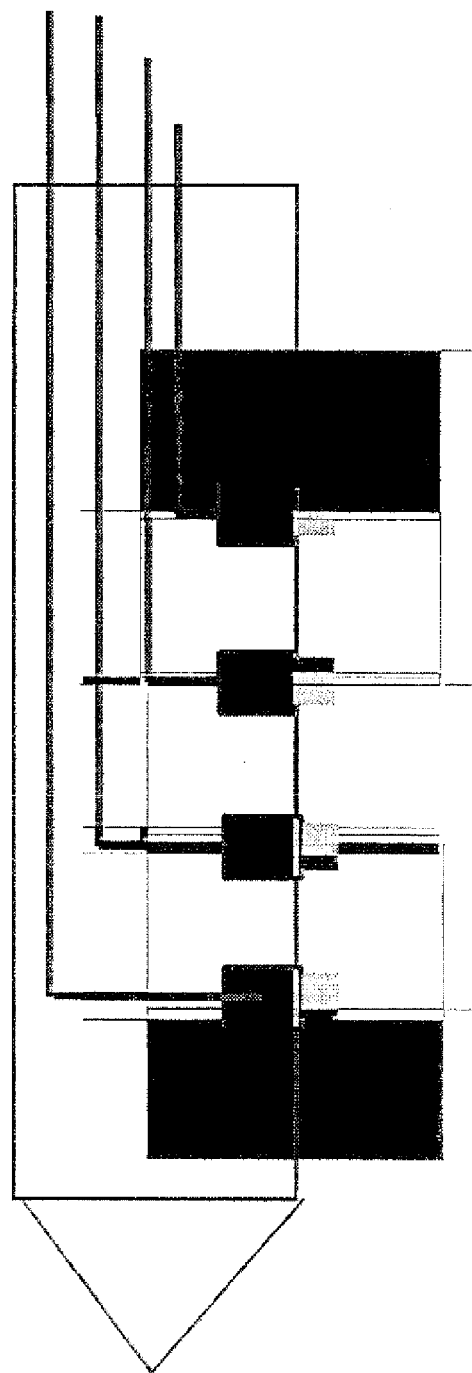
FIG. 7 is a side view of a geoelectrical probe with the non-polarizing electrode option.

FIG. 1 also shows four of the 30 stainless steel electrode rings. In actuality there should be 30 stainless steel electrode rings shown on the drawing, but only 4 are shown for clarity. If self potential or induced polarization measurements are necessitated, then the probe can be customized by replacing these stainless steel ring electrodes with non-polarizing electrodes (see FIGS. 6 & 7).

Figure 2:
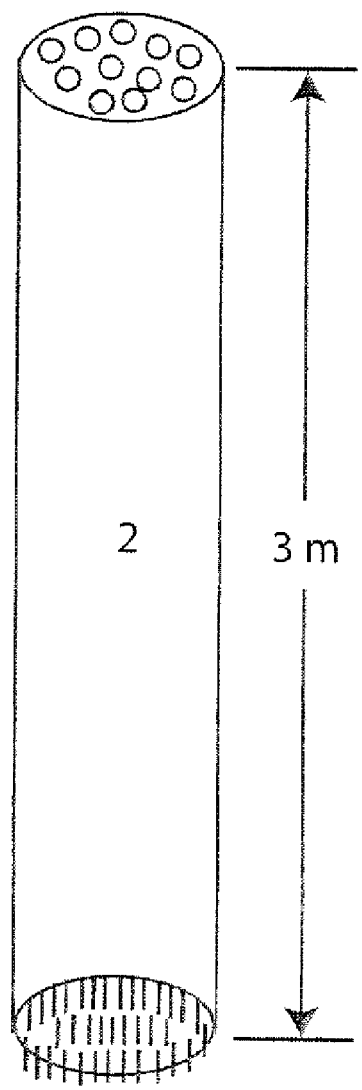
FIG. 2 is an orthogonal view of an intermediate section of the geoelectrical probe containing electrodes 31-60.
Figure 3:
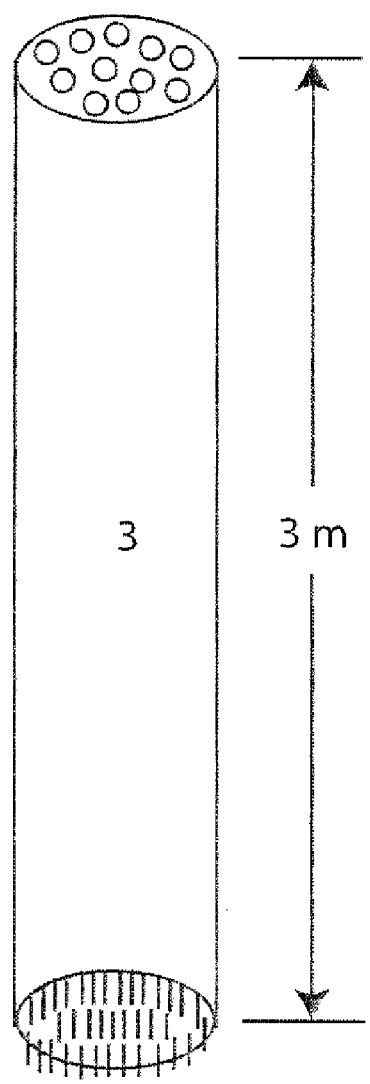
FIG. 3 is an orthogonal view of the final or shallowest section of a geoelectrical probe containing electrodes 61 to 90.
Figure 4:
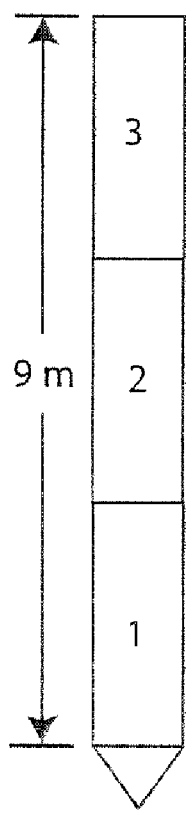
FIG. 4 is an orthogonal view of the fully assembled 9 meter geoelectrical probe. Labeled are sections 1, 2, and 3. This example probe would contain 90 electrodes.

If a longer total probe length is needed, then FIGS. 2, 3, and 4 demonstrate how multiple sections can be assembled to complete a 9 meter long probe with a total of 90 electrodes, for example.

FIG. 2 illustrates the second 3 meter section of a 9 meter probe having electrodes number 31 through 60. The bottom of this section connects to section #1 (FIG. 1) and the resulting 60 electrode sockets are at the top of section #2 to connect to the top and last section.

The electrical connection to each additional section can be accomplished in three different methods, which are determined at the time of construction of the probe. The first option is a ball bearing or swivel connection. In this case, the electrode sockets are installed in a ball bearing race within the end of the probe section. The electrical connection pins are installed in a similar ball bearing race so that as the probe sections are screwed together the wires do not become twisted but swivel in place. Second option, is the simple socket and pin connection with a keyed flush slip ring, which is similar to a military type multi-wire connector. The third option is to route the wires in an inner wire conduit within the probe such that the wires are separate from the probe pipe section. In this manner the probe pipe sections can be screwed together and the wires in the inner conduit are allowed to accommodate this twisting without breaking.

FIG. 3 shows the last section (#3) of the 9 meter long example probe. This last section connects to the 60 electrode socket from the combined first two sections. Then the top of this final section #3 contains 90 sockets for the connection to the extension cable which then connects to a acquisition instrument FIG. 4 shows the final assembled 9 meter probe made up of three sections 1, 2, and 3 which are fully connected and contain a total of 90 electrodes. Each electrode is addressed via its own corresponding wire at the surface.

Figure 5:
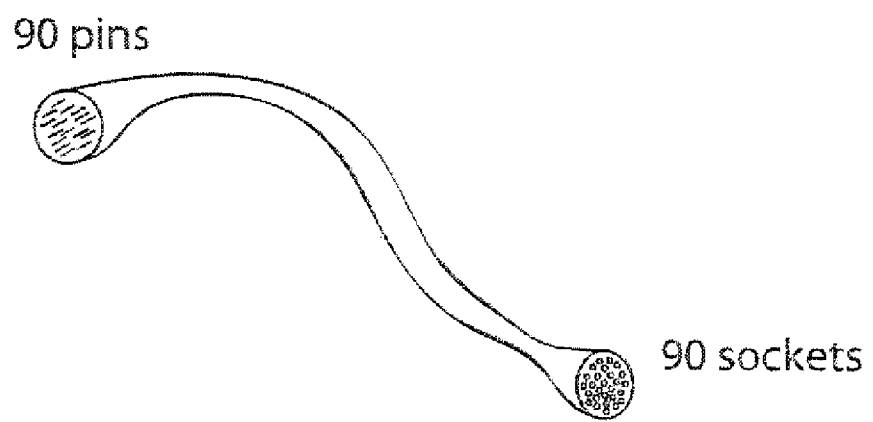
FIG. 5 is a side view of an extension wire bundle. This wire bundle connects to the top of the fully assembled probe in FIG. 4 and to an acquisition instrument.

FIG. 5 illustrates the example extension wire bundle used to connect the probe to the acquisition instrument. In the case of this example the extension wire bundle contains 90 electrode contacts. Note that each wire bundle is customized for connection to the end of each probe depending on the total length of the probe. In the extension wire bundle shown in FIG. 5, 90 electrical contacts are shown because the example probe was 9 meters long, with electrodes every 10 cm along the total length of the probe. Again, the total length of the installed probe is dependent on the application. The total length of the probe is customizable and is based on adding 3 meter long sections together. At a minimum, the probe is 3 meters long. The example shows a 9 meter long probe made up of three sections.

Examples of measurements made include apparent resistivity, self potential, or induced polarization. Apparent resistivity (or generally termed resistivity) is an effectual resistivity of a volume of earth, which is determined by the geometrical arrangement of electrodes. These measurements are made using the stainless steel ring electrodes. The apparent resistivity is a calculated value determined from the measurement of the current injected through the electrodes, the measured voltage drop across certain electrodes, and the geometric factor determined by the electrode spacing. For self-potential and induced polarization measurements, non-polarizing electrodes must be used and therefore the probe must be customized to the electrode type shown in FIG. 7.

The measurement for self-potential is a voltage drop across select electrodes with no excitation current transmitted. Induced polarization measurements are similar to apparent resistivity measurements with the addition of the voltage drop measured across differ time windows or different frequencies of transmitted current. Induced polarization measurements inherently include a measurement of the apparent resistivity. All of the above measurements are standard geophysical methods. The uniqueness of this application is in the permanent probe (or effective string of electrodes) installed in the earth at select depths.

In order to produce a geoelectrical depth profile, the probe is positioned or installed into the near subsurface of the earth. The installation is performed similarly to a groundwater monitoring well. The depth of intended investigation governs the number of probe sections installed. The first probe section includes a drive point to seal the end of the probe and provide a environmental seal. Subsequent sections are added as needed and the final installed probe is connected via an extension wire (e.g. FIG. 5) to an industry standard geoelectrical acquisition instrument for data measurement and collection. Depending on the acquisition system, a wire connection or switch box interface may be required.

The present probe is designed for electrode spacing of about two to four inches (5 to 10 cm), whereas conventional downhole tools have electrodes spaced every four, eight or sixteen inches. Furthermore, the present probe is customizable per application and is permanently installed for time series measurements.

For conventional downhole or depth surveys into the earth, the downhole tool is lowered into an open borehole and data is logged while operated, then the tool is removed. The present probe is permanently (or semi-permanently as it can be removed similar to a monitoring well) installed into the ground with electrode contacts to the subsurface. The probe is left in the ground in situ for continuous or periodic measurements. The present probe can measure multiple geoelectric measurements in multiple geometric configurations (various electrode spacings). For example as described above in [0032], the probe can measure DC resistivity, self-potential and induced polarization at various electrode spacing, whereas conventional probes measure only DC resistivity.

The present probe can be permanently installed in the ground. It can be removed once it is no longer needed, similar to monitoring a well. The greater number of electrodes per section as compared with conventional probes provides a very high spatial resolution. The electrode wiring within the probe makes it possible to have multiple electrode arrays for data acquisition. Among the parameters that can be measured are direct current resistivity, self-potential, and induced polarization or complex resistivity. The type of connection, either ball bearing swivel, slip ring, or wire conduit between the sections is customizable and unique.

Table 1 gives examples of electrode spacing layouts for metric measurements.

TABLE 1

Example of electrode spacing layout for metric measurements

| Probe Section 1 | | | Probe Section 2 | | | Probe Section 3 | | |
|---|---|---|---|---|---|---|---|---|
| Electrode # | cm from bottom | m from bottom | Electrode # | cm from bottom | m from bottom | Electrode # | cm from bottom | m from bottom |
| 1 | 5 | 0.05 | 31 | 305 | 3.05 | 61 | 605 | 6.05 |
| 2 | 15 | 0.15 | 32 | 315 | 3.15 | 62 | 615 | 6.15 |
| 3 | 25 | 0.25 | 33 | 325 | 3.25 | 63 | 625 | 6.25 |
| 4 | 35 | 0.35 | 34 | 335 | 3.35 | 64 | 635 | 6.35 |
| 5 | 45 | 0.45 | 35 | 345 | 3.45 | 65 | 645 | 6.45 |
| 6 | 55 | 0.55 | 36 | 355 | 3.55 | 66 | 655 | 6.55 |
| 7 | 65 | 0.65 | 37 | 365 | 3.65 | 67 | 665 | 6.65 |
| 8 | 75 | 0.75 | 38 | 375 | 3.75 | 68 | 675 | 6.75 |
| 9 | 85 | 0.85 | 39 | 385 | 3.85 | 69 | 685 | 6.85 |
| 10 | 95 | 0.95 | 40 | 395 | 3.95 | 70 | 695 | 6.95 |
| 11 | 105 | 1.05 | 41 | 405 | 4.05 | 71 | 705 | 7.05 |
| 12 | 115 | 1.15 | 42 | 415 | 4.15 | 72 | 715 | 7.15 |
| 13 | 125 | 1.25 | 43 | 425 | 4.25 | 73 | 725 | 7.25 |
| 14 | 135 | 1.35 | 44 | 435 | 4.35 | 74 | 735 | 7.35 |
| 15 | 145 | 1.45 | 45 | 445 | 4.45 | 75 | 745 | 7.45 |
| 16 | 155 | 1.55 | 46 | 455 | 4.55 | 76 | 755 | 7.55 |
| 17 | 165 | 1.65 | 47 | 465 | 4.65 | 77 | 765 | 7.65 |
| 18 | 175 | 1.75 | 48 | 475 | 4.75 | 78 | 775 | 7.75 |
| 19 | 185 | 1.85 | 49 | 485 | 4.85 | 79 | 785 | 7.85 |
| 20 | 195 | 1.95 | 50 | 495 | 4.95 | 80 | 795 | 7.95 |
| 21 | 205 | 2.05 | 51 | 505 | 5.05 | 81 | 805 | 8.05 |
| 22 | 215 | 2.15 | 52 | 515 | 5.15 | 82 | 815 | 8.15 |
| 23 | 225 | 2.25 | 53 | 525 | 5.25 | 83 | 825 | 8.25 |
| 24 | 235 | 2.35 | 54 | 535 | 5.35 | 84 | 835 | 8.35 |
| 25 | 245 | 2.45 | 55 | 545 | 5.45 | 85 | 845 | 8.45 |
| 26 | 255 | 2.55 | 56 | 555 | 5.55 | 86 | 855 | 8.55 |
| 27 | 265 | 2.65 | 57 | 565 | 5.65 | 87 | 865 | 8.65 |
| 28 | 275 | 2.75 | 58 | 575 | 5.75 | 88 | 875 | 8.75 |
| 29 | 285 | 2.85 | 59 | 585 | 5.85 | 89 | 885 | 8.85 |
| 30 | 295 | 2.95 | 60 | 595 | 5.95 | 90 | 895 | 8.95 |

Table 2 gives examples of electrode spacing layouts for English measurements.

TABLE 2

Example of electrode spacing layout for English measurements

| | Probe Section 1 | | | | Probe Section 2 | | | | Probe Section 3 | | |
|---|---|---|---|---|---|---|---|---|---|---|---|
| Electrode # | cm from bottom | inches from bottom | ft from bottom | Electrode # | cm from bottom | inches from bottom | ft from bottom | Electrode # | cm from bottom | inches from bottom | ft from bottom |
| 1 | 5 | 1.969 | 0.16 | 16 | 5 | 1.969 | 0.16 | 31 | 5 | 1.969 | 0.16 |
| 2 | 15 | 5.906 | 0.49 | 17 | 15 | 5.906 | 0.15 | 32 | 15 | 5.906 | 0.15 |
| 3 | 25 | 9.843 | 0.82 | 18 | 25 | 9.843 | 0.25 | 33 | 25 | 9.843 | 0.25 |
| 4 | 35 | 13.79 | 1.15 | 19 | 35 | 13.78 | 0.35 | 34 | 35 | 13.78 | 0.35 |
| 5 | 45 | 17.717 | 1.48 | 20 | 45 | 17.717 | 0.45 | 35 | 45 | 17.717 | 0.45 |
| 6 | 55 | 21.654 | 1.8 | 21 | 55 | 21.654 | 0.55 | 36 | 55 | 21.654 | 0.55 |
| 7 | 65 | 25.591 | 2.13 | 22 | 65 | 25.591 | 0.65 | 37 | 65 | 25.591 | 0.65 |
| 8 | 75 | 29.528 | 2.46 | 23 | 75 | 29.528 | 0.75 | 38 | 75 | 29.528 | 0.75 |
| 9 | 85 | 33.465 | 2.79 | 24 | 85 | 33.465 | 0.85 | 39 | 85 | 33.465 | 0.85 |
| 10 | 95 | 37.402 | 3.12 | 25 | 95 | 37.402 | 0.95 | 40 | 95 | 37.402 | 0.95 |
| 11 | 105 | 41.339 | 3.44 | 26 | 105 | 41.339 | 1.05 | 41 | 105 | 41.339 | 1.05 |
| 12 | 115 | 45.276 | 3.77 | 27 | 115 | 45.276 | 1.15 | 42 | 115 | 45.276 | 1.15 |
| 13 | 125 | 49.213 | 4.1 | 28 | 125 | 49.213 | 1.25 | 43 | 125 | 49.213 | 1.25 |
| 14 | 135 | 53.15 | 4.43 | 29 | 135 | 53.15 | 1.35 | 44 | 135 | 53.15 | 1.35 |
| 15 | 145 | 57.087 | 4.76 | 30 | 145 | 57.087 | 1.45 | 45 | 145 | 57.087 | 1.45 |

It is to be understood that the phraseology or terminology employed herein is for the purpose of description and not of limitation. The means and materials for carrying out various disclosed functions may take a variety of alternative forms without departing from the invention.

Thus, the expressions "means to . . . " and "means for . . . " as may be found in the specification above and/or in the claims below, followed by a functional statement, are intended to define and cover whatever structural, physical, chemical, or electrical element or structures which may now or in the future exist for carrying out the recited function, whether or not precisely equivalent to the embodiment or embodiments disclosed in the specification above. It is intended that such expressions be given their broadest interpretation.

What is claimed is:

1. A probe for long-term in situ measurement of the geoelectrical profile of a geological formation comprising:
   (a) a first section and optionally at least one additional section for customization;
   (b) said first section having a drive point for insertion into the ground and to seal the bottom end of the probe;
   (c) said first section having sockets for electrical wires in a ball bearing, slip ring, or wire conduit to eliminate wire twisting and connection to the next section or to the extension wire bundle;
   (d) said next section(s) having pins at one end thereof in similar type to said first section to enable connection and electrical continuity;
   (e) each section containing electrode rings to serve as electrical coupling to the earth, said electrode rings being in electrical continuity with connections on the end of the probe.

2. The probe according to claim 1 wherein the first section is attached to said at least one additional section(s) with environmentally sealed connection.

3. The probe according to claim 1 wherein each electrode has its own wire connected to an acquisition system thereby enable multiple electrode configurations.

4. The probe according to claim 1 wherein said electrode rings are spaced about 10 cm along the length of each section and about 5 cm from the end of each probe section.

5. The probe according to claim 1 wherein said electrode rings are made of stainless steel or are non-polarizing porous pot electrodes.

* * * * *